US005930341A

United States Patent [19]
Cardillo, IV et al.

[11] Patent Number: 5,930,341
[45] Date of Patent: *Jul. 27, 1999

[54] ADSI WEB BROWSER FOR RETRIEVING INTERNET DATA FILES

[75] Inventors: Raymond A. Cardillo, IV; Thomas Kredo, both of Rochester, N.Y.

[73] Assignee: Northen Telecom, Limited, Canada

[*] Notice: This patent is subject to a terminal disclaimer.

[21] Appl. No.: 08/902,101

[22] Filed: Jul. 29, 1997

Related U.S. Application Data

[62] Division of application No. 08/815,663, Mar. 10, 1997.

[51] Int. Cl.$^6$ .................................................. H04M 11/00
[52] U.S. Cl. ..................................... 379/93.25; 379/90.01
[58] Field of Search ............................ 379/90.01, 93.01, 379/93.05–93.09, 93.12–93.15, 93.17–93.31, 93.37, 110.01, 387, 900

[56] References Cited

U.S. PATENT DOCUMENTS

| | | | |
|---|---|---|---|
| 5,394,461 | 2/1995 | Garland | 379/106 |
| 5,524,141 | 6/1996 | Braun et al. | 379/93 |
| 5,530,852 | 6/1996 | Meske, Jr. et al. | 395/600 |
| 5,541,986 | 7/1996 | Hou | 379/201 |
| 5,572,727 | 11/1996 | Larsson et al. | 395/616 |
| 5,588,044 | 12/1996 | Lofgren et al. | 379/67 |
| 5,590,178 | 12/1996 | Murakami et al. | 379/96 |
| 5,594,490 | 1/1997 | Dawson et al. | 348/6 |
| 5,594,491 | 1/1997 | Hodge et al. | 378/7 |

OTHER PUBLICATIONS

Bellcore, "Generic Requirements for an SPCS to Customer Premises Equipment Data Interface for Analog Display Services," Technical Reference No. Tr–NWT–001273, Issue No. 1, pp. 1–1—A4 (Dec. 1992).

Bellcore, "*Technical Reference Bullentin No. 2,*" Revision of TR–NWT–001273, pp. 1–3 (Oct. 1993).

Bellcore, "*Technical Reference Notice of Disclaimer,*" Revision of TR–NWT–001273, pp. 1–1—R2, (Jun. 1995.).

Bellcore, "*Technical Reference Bulletin,*" Revision of TR–NWT–001273, pp. 1–3 (Jun. 1993).

Bellcore, "*Technical Reference Bulletin No. 3,*" Revision of TR–NWT–001273, pp. 1–10 (Dec. 1993).

NT Northern Telecom, "ACMS Server High Level Software Design, System Design Specification," Multimedia Bus. Appln., No. 355–01533–00002, pp. 1–23 (Dec. 1994).

Unwired Planet, Inc., "*Using the Up.Browser,*" Ver. 1.0.1, pp. 1–13 (Aug. 1996).

Unwired Planet, Inc., "*HDML Language Reference,*" Ver. 1.0, pp. 1–52 (Jul. 1996).

Unwired Planet, Inc., "*Up.Link Developer's Guide,*" Ver. 1.0, pp. 1–46 (Jul. 1996).

NT Northern Telecom, "*The ABC's of Display Based,*" Issue 1, pp. 17–36 (Jan. 1995).

NT Northern Telecom, "*Service Generator User's Guide,*" No. 203–3071–900, (May. 1993).

U.S. Orders Introduces Revolutionary Internet–Based Service To Smart Telephone Users in All 50 States for 7.95 a Month; Roll–out to Pagers, PDA's & Cellular Phones Planned for 1997, (Sep. 1996).

Bob Emerson, "With simultaneous voice and data, new screen phones will bring better services," BYTE (Jan. 1996).

Terry Yarbrough and Lois Andreasen, "ADSI on the Rise" (Sep. 06, 1996).

*Primary Examiner*—Wing F. Chan
*Attorney, Agent, or Firm*—Finnegan, Henderson, Farabow, Garrett & Dunner, L.L.P.

[57] ABSTRACT

A browser device and method for interfacing screen-display telephone terminals with the Internet. The browser device located on an ADSI capable telephone platform server, retrieves requested data files from an Internet site and formats the retrieved data file specifically for display on the screen-display telephone terminal.

10 Claims, 8 Drawing Sheets

ADSI WEB BROWSER FOR RETRIEVING INTERNET DATA FILES

This is a division of application Ser. No. 08/815,663, filed Mar. 10, 1997.

I. BACKGROUND OF THE INVENTION

A. Field of the Invention

This invention generally relates to the field of Analog Display Services Interface (ADSI) and in particular to a system and method for interfacing a screen-display telephone device with the World Wide Web or Internet.

B. Description of the Prior Art

1. ADSI Display Devices

ADSI is a telecommunications protocol standard developed by Bellcore and published in Bell Communications Research report "Generic Requirements for an SPCS to Customer Premises Equipment Data Interface for Analog Display Services," Technical Reference TR-NWT-001273, December 1992 (incorporated herein by reference). ADSI enables alternate voice and data capability over the existing analog telephone network. This capability permits ADSI devices to communicate with users through a familiar voice response audio interface, where the user listens to voice recordings and makes menu selections using the telephone keypad, and with visual menus and information on a screen display, where service selections can be made using softkeys. Currently, ADSI devices are often implemented as screen-display telephone terminals, but there can also be television set-top boxes allowing users to make calls using the television, personal digital assistants (PDAs), pagers, and personal computers that are ADSI capable.

In addition to real-time interactive applications, ADSI also enables program transfer using a capability known as Feature Download. These programs, or service scripts, can be developed by a server and run on a local terminal. In many cases, these scripts are created by an authoring tool and stored in an external database for access by the telephony platform serving the user. Therefore, when new features are requested by the user, or are newly added by the server, the scripts are transferred by the telephony platform to the ADSI terminal where they are stored in memory and executed by the terminal until overwritten. These scripts define not only call flow, but also define the softkeys and displays presented to the user during a call.

One example of applied ADSI technology is Northern Telecom's Advanced Call Management Service (ACMS). In ACMS, customer selected features are stored in an external database. When a customer calls in for activation of services, a database lookup is performed so that the appropriate information for that customer can be downloaded to the telephone. The application runs on a Network Applications Vehicle (NAV), which is typically a UNIX-based telephony platform, and which reads an object file to get information concerning the call flow. The NAV presents the call flow, including ADSI commands, to the end user and as a result a new application is presented to the terminal.

In addition, any server may create Custom Local Area Signaling Services (CLASS)$^{SM}$ or Custom Calling Features (CCF) and download these advanced feature download scripts that are specifically tailored to the user's service subscription. As a result, a user can activate services such as three-way calling, call waiting, and call forwarding through context sensitive screen prompts and softkeys. These advanced call management telephony script applications have been a primary area of development for ADSI display terminals.

An example of advanced ADSI script transfer is disclosed in U.S. Pat. No. 5,541,486, to Hou. Specifically, Hou discloses a method and system for automatically consolidating service scripts for downloading to ADSI-compatible screen-display telephones. The method and system comprises specifying a general template for a set of service features, specifying line specific attributes for a feature, and then combining the two into a service module. A customer's service is composed of multiple service modules which, when selected, would be consolidated by a network server computer into a single service script. Hou also discloses compiling the consolidated service script for downloading and transmission to a local processor in the compatible screen-display telephone.

2. The Internet

The Internet, or "net," fueled by the popularity of the World Wide Web (WWW or Web), has exhibited significant growth over the past few years. At present, to access the information available on the Web, users typically use standard computer equipment, such as a home personal computer with a display and modem, and an Internet connection.

There have been efforts to expand the number of users and the ease with which they access the net. For example, several companies have developed television set-top boxes that permit users to browse or "surf" the Internet from their television sets. In addition, telephone companies have joined with software developers to allow mobile communication devices such as cellular telephones, pagers, and PDAs to access some features of the Internet.

At present, several types of Internet connections are available. For example, to use an Internet connection from Internet Service Providers (ISPs), the user dials into a computer at the ISP's facility using a modem and standard telephone line. The ISP's computer in turn provides the user with access to the Internet. Through this Internet connection, the user can access information on the Web using a computer program called a "Web browser," such as for example the Netscape Navigator™ from Netscape Communications Corporation. The Web browser is a software program that allows a user to view the data received from an Internet site location. To accomplish this, the user gives the Web browser a Uniform Resource Locator (URL) for an object on the Internet, for example, a data file containing information of interest. The document is referred to as a "Web page," and the information contained in the Web page is called content. Web pages often refer to other Web pages using "hypertext link" or "hyperlinks" that include words or phrases representing the other pages in a form that gives the browser the URL for the corresponding Web page when a user selects a hyperlink.

Hyperlinks are made possible by building Web pages using a Hypertext Markup Language (HTML), an evolving language which is used to construct documents in a uniform, standardized format so they may be accessed by Web browsers and displayed for the user. HTML is an ASCII text-based language which defines page formats used to display the HTML elements. To ensure accessibility, all HTML documents have a "point-of-contact" name, or ANCHOR, identified in the document as part of the ANCHOR element. This name is hyperlink-enabled by surrounding the name with the <A> element. This feature permits a user to link with another URL when the ANCHOR element is selected.

Once the user selects a site to visit, the URL identifies a specific host computer on the Internet, called a "Web Server," and, more particularly, the location of a Web page located on the Web Server. The Web browser retrieves the Web page and displays it for the user. Hypertext Transfer Protocol (HTTP) is the most widely used format to access and link users with various other Web pages or sites referenced by the original Web page. HTTP requires a program running on the host computer that understands and responds to this protocol. The file retrieved might be, for example, an HTML file, a graphic file, a sound file, an animation sequence file, a file to be executed by the Web server (e.g., CGI programs), or a word processing file. Ultimately, whether the file can be retrieved or handled depends on the features and capabilities of the browser. When a browser requests a specific URL, it sends the request to the sponsoring Web server. The Web server receives the request and attempts to fulfill the request.

There are several ways that user requests can be fulfilled. For example, Web servers translate a request such as "http://www.recipes.com/recipes/soup.htm" into a search for a physical file on that server. It would start from the base directory for that domain and then apply the path that was requested. In this example, the Web server would look for a directory called "recipes" and then look for a file called "soup.htm" within that directory. If the file was found it would be passed back, without modification, to the requesting browser. In this way, the URL can be thought of as a specific file sitting on a server, or host computer.

Common Gateway Interface (CGI) was created as one way for Web servers to achieve a dynamic element by calling to programs that reside on the server. This dynamic element allows the Web server to immediately respond to the request without doing additional processing. The server receives a request from the browser, and it uses the dynamic element, or hypertext link, to connect with a new process. The server then passes CGI based tagged data that will be used by the program to create, for example, the HTML file. The CGI program executes the associated display format subroutine, or script file, and accesses other data sources to generate the content and then returns the HTML back to the HTTP server. Once the transfer is completed, the CGI process terminates and the server transfers the HTML back to the requesting browser.

An alternative to using separate CGI scripts to define content is a template-based HTML that actually embeds a request for the dynamic data within the HTML file itself. When specific page is requested, a pre-processor scans the file for proprietary tags that are then translated into final HTML based on the request. The final HTML is then passed back to the server and on to the browser for the user to view on their computer terminal. While the examples given have been explained in the context of HTML, both CGIs and templates may be created with any Standard Generalized Markup Language (SGML) based markup language, such as Handheld Device Markup language (HDML). HDML is a markup language designed and developed by AT&T and Unwired Planet, Inc. to allow handheld devices some access to the resources of the Internet. The specifics of the language are disclosed in "HDML Language Reference, Version 1.0," Unwired Planet, Inc., July 1996, and herein incorporated by reference.

While computer terminals and other devices that are configured to receive HTTP signals and HTML files may utilize the above methods to access and view the Internet data, the specific display standards for ADSI devices, as well as the display capabilities for ADSI and other screen-display telephones, allow only a limited view of HTTP transferred HTML files. In addition, ADSI display characteristics do not permit a user to take advantage of the hypertext features imbedded in most HTML data files.

While the capability of ADSI devices have been explored to provide users with more advanced consumer-based telephone services, ADSI devices have not previously been integrated successfully and effectively with the vast resources of the Internet. In addition to permitting ADSI devices to retrieve data files from the Internet, the proposed ADSI Internet interface would also provide users with the ability to "jump" between ADSI applications by giving applications an imbedded link to other ADSI applications. This benefit would be similar to the benefits of hyperlinks used in HTML and has not been effectively implemented for ADSI application. Therefore, a need exists for a system and method that would allow ADSI device s to access and retrieve data from the Internet as well as link ADSI applications.

II. SUMMARY OF THE INVENTION

In an effort to expand the utility of ADSI devices and provide users with an alternate means for accessing the resources of the Internet, it is a goal of the present invention to permit the users of screen-display telephone terminals to access and retrieve Internet data files. In accordance with the purpose of the invention, as embodied and broadly described herein, a method is provided for retrieving and displaying data files from an Internet location comprising the steps of: receiving, at a screen-display telephone terminal, a data file request from a user; transmitting the data file request to a telephony platform server; receiving the data file request at the telephony platform and transmitting an Internet protocol message to an Internet site location, wherein the Internet protocol message corresponds to the data file request received from the user and the Internet site location corresponds to the data file requested by the user; retrieving an Internet data file from the Internet site location and formatting the Internet data file received in response to the Internet protocol message for display on the screen-display telephone terminal; transmitting, from the telephony platform server, the Internet data file to the telephone terminal, wherein said Internet data file is formatted for display on the screen-display telephone terminal; and displaying the formatted data file on the screen-display telephone terminal.

In another aspect, the invention provides a system for interfacing at least one ADSI screen-display telephone terminal with a plurality of Internet site locations, wherein the Internet site locations contain data files, the system comprising: an ADSI screen-display telephone terminal for transmitting a data file request to an ADSI telephony platform server and displaying an Internet data file retrieved from one of the plurality of Internet site locations; and a browser device residing on the ADSI telephony platform server for retrieving the Internet data file and formatting the retrieved data file to a format that corresponds to the display characteristics of the terminal.

In yet another aspect, the invention provides an ADSI screen-display telephone terminal for receiving and displaying a data file retrieved from an external server apparatus, the terminal comprising: an integrated screen-display for presenting a user with a selection of data files and displaying the retrieved data file; a data file selection device, connected to the screen-display, for transmitting a data file selection signal to a telephony platform; and a receiver apparatus, connected to the screen-display, for receiving the retrieved data file in response to the data file selection signal.

Additional advantages of the invention will be set forth in part in the description which follows, and in part can be known from the description, or may be learned by practice of the invention. The advantages of the invention will be realized and attained by means of the elements and combinations particularly pointed out in the appended claims thereof as well as the appended drawings.

It should be understood that both the foregoing general description and the following detailed description are exemplary and explanatory and are intended to provide a further explanation of the invention as claimed.

III. BRIEF DESCRIPTION OF THE DRAWINGS

IV. DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

A. The System

Figure 1:
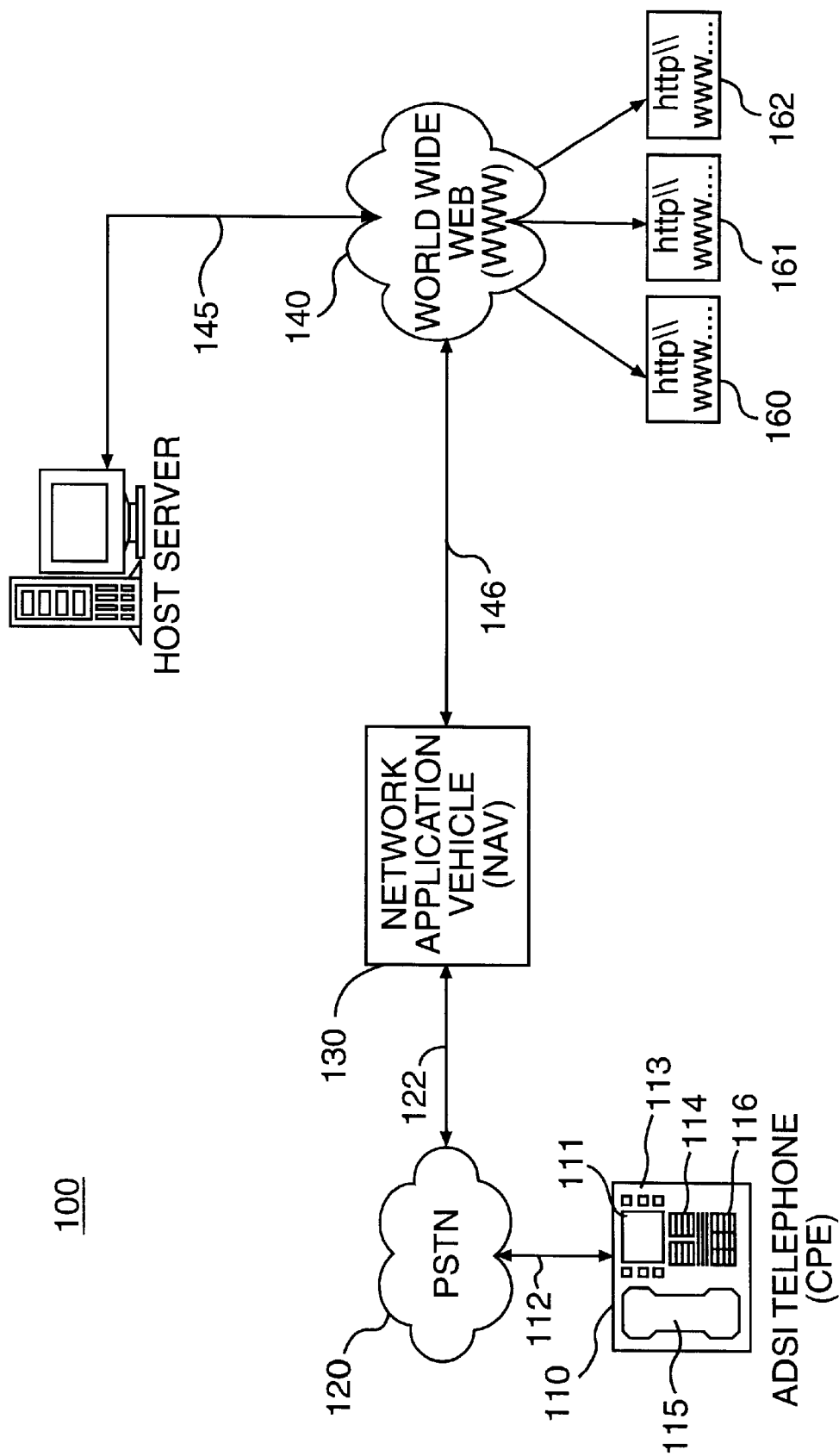
FIG. 1 is a block diagram showing an Internet interface system consistent with the present invention.
Figure 2:
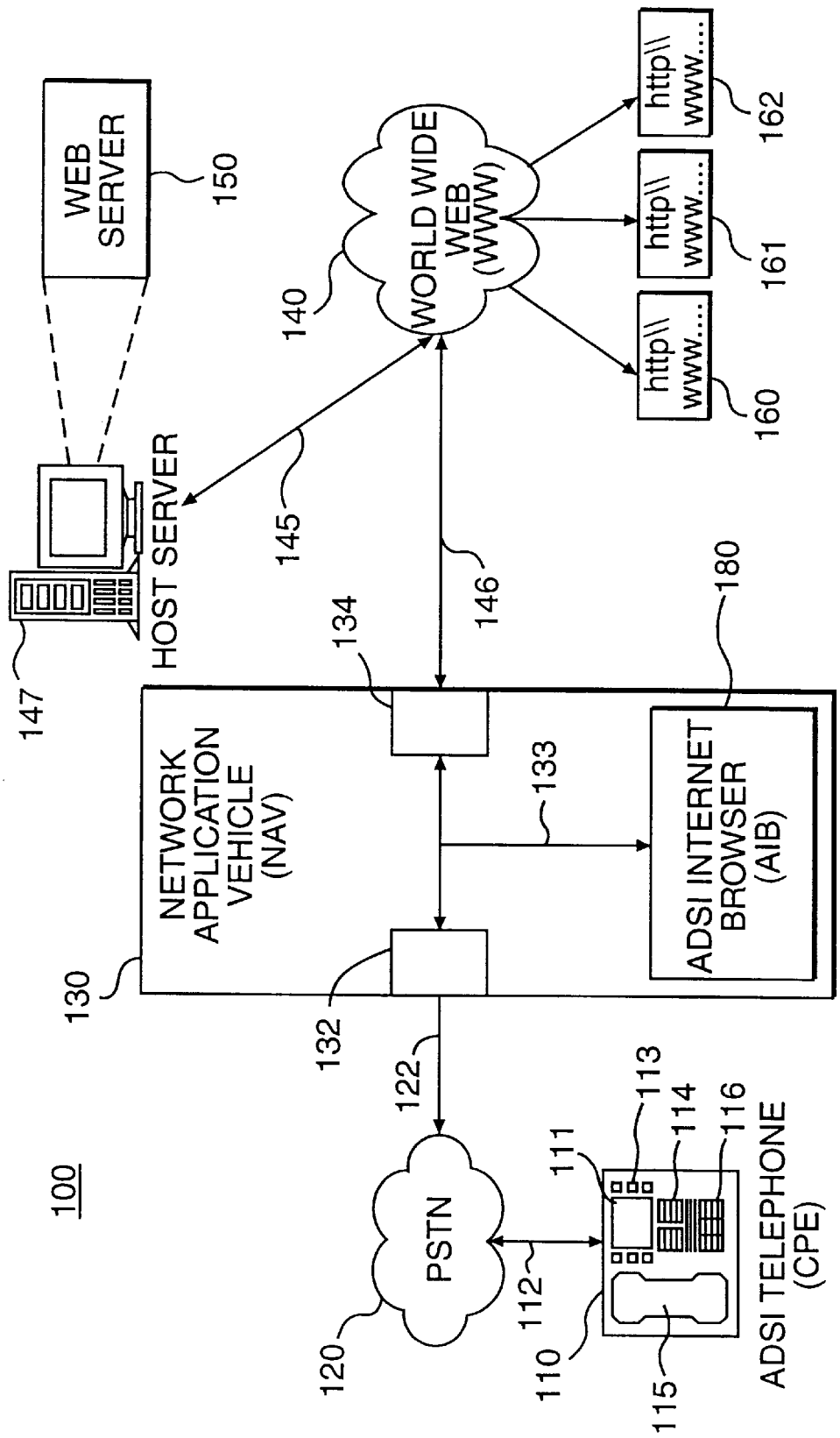
FIG. 2 is a block diagram showing further details of the Internet interface system of FIG. 1.

FIGS. 1 and 2 are block diagrams showing an ADSI-based Internet access system 100 consistent with the present invention. FIG. 1 shows the overall make-up of the system 100, while FIG. 2 shows a more detailed layout of the system 100. A telephone terminal, such as an ADSI screen-display telephone terminal 110 or other suitable Customer Premise Equipment (CPE), having an integrated screen-display 111, is connected to public switched telephone network (PSTN) 120 that routes calls and data transfers from terminal 110 to the Network Application Vehicle (NAV) 130 via standard telephone interface lines 112 and 122. NAV 130 is a telephony platform server for controlling call and data flow between the terminal 110 and the Web 140. As further described below, NAV 130 includes ADSI Internet Browser (AIB) 180, an ADSI protocol specific Web browser that can retrieve data files from the Internet and format the data file to an ADSI protocol formatted data display block for display on screen-display 111. NAV 130 also contains a memory device 132 for receiving and storing Internet protocol messages, and a memory device 134 for storing data files and messages transmitted from the Internet.

The Web 140, as well as the term Internet, are generic terms for a multiple of well known protocols and standards used over a standard datalink such as connections 145 and 146. Host Server 155 is a remote computer system accessible over the Internet or other communication medium along line 145. Host computer Server 155 contains Web Server 150, which is a server application program for accessing Web pages from various Internet sites and retrieving data files from, for example, URLs 160–162, through the Internet using existing Web architecture. Preferably, Web Server 150 presents the accessed Web pages to the requestor, in this case AIB 180, in HTML format. Web Server 150 also permits a service provider to insert ANCHOR "tags" on specific Web pages that would point AIB 180 to specifically designed ADSI Telephone Hypertext Markup Language (ATML) files, or also HDML formatted data files. Moreover, Web Server 150 receives Internet requests from AIB 180 through the Wet) 140 to locate and access a number of URLs, such as for example URLs 160–162. URLs 160–162 could be Web site locations such as a Yahoo Home Page, a Nortel Home Page, or a Lycos Homepage, and additional URLs could include a Hello World Homepage, or a time/temperature site.

Terminal 110 may be any ADSI compatible device, or other screen-display telephone terminal, capable of receiving and storing upgrade command files, service scripts, and transmitted data from NAV 130 through PSTN 120. One example is Nortel's Power Touch 350, which includes an 8×20 character LCD screen-display 111, a series of programmable softkeys 113 for a user's selection of a particular data file or other displayed functions, a standard telephone speaker 114, handset 115, and a standard 12 character telephone key pad 116.

Terminal 110 communicates with NAV 130 by standard transmission of ADSI protocol transmission signals along line 112, PSTN 120, and line 122. The ADSI protocol transmission signals may include, but are not limited to, Dual Tone Multi Frequency (DTMF) signals. For a more detailed description of ADSI communication signal requirements, refer to Bell Communications Research report "Generic Requirements for an SPCS to Customer Premises Equipment Data Interface for Analog Display Services," Technical Reference TR-NWT-001273, December 1992 (incorporated herein by reference).

NAV 130 may be any telephony platform capable of retrieving, storing, and transmitting both data and command files. In the present embodiment, and by way of example only, NAV 130 can be a UNIX-based ADSI capable platform implemented through well-known hardware, but with specific software functions described herein for the present invention. NAV 130 includes a UNIX-based processor, and a number of internal memory locations including, a first memory 132 for receiving and storing data files and messages transmitted from terminal 110, and a second memory 134 for receiving data files from the Internet. NAV 130 also includes AIB 180 which is connected to memory devices 132 and 134 via data bus 133. In addition, as further described below, NAV 130 controls the call flow and data transfers between the Host Server apparatus 155 and terminal 110. NAV 130 also allows a service provider to create and store ADSI data files written in a markup language specifically formatted for screen-display telephone terminals. This language could comprise a standard text-based markup language similar to HTML, or could include a modified version of HDML, or a specifically designed ATML, and serve as a substitute for conventional ADSI scripting language.

Figure 3:
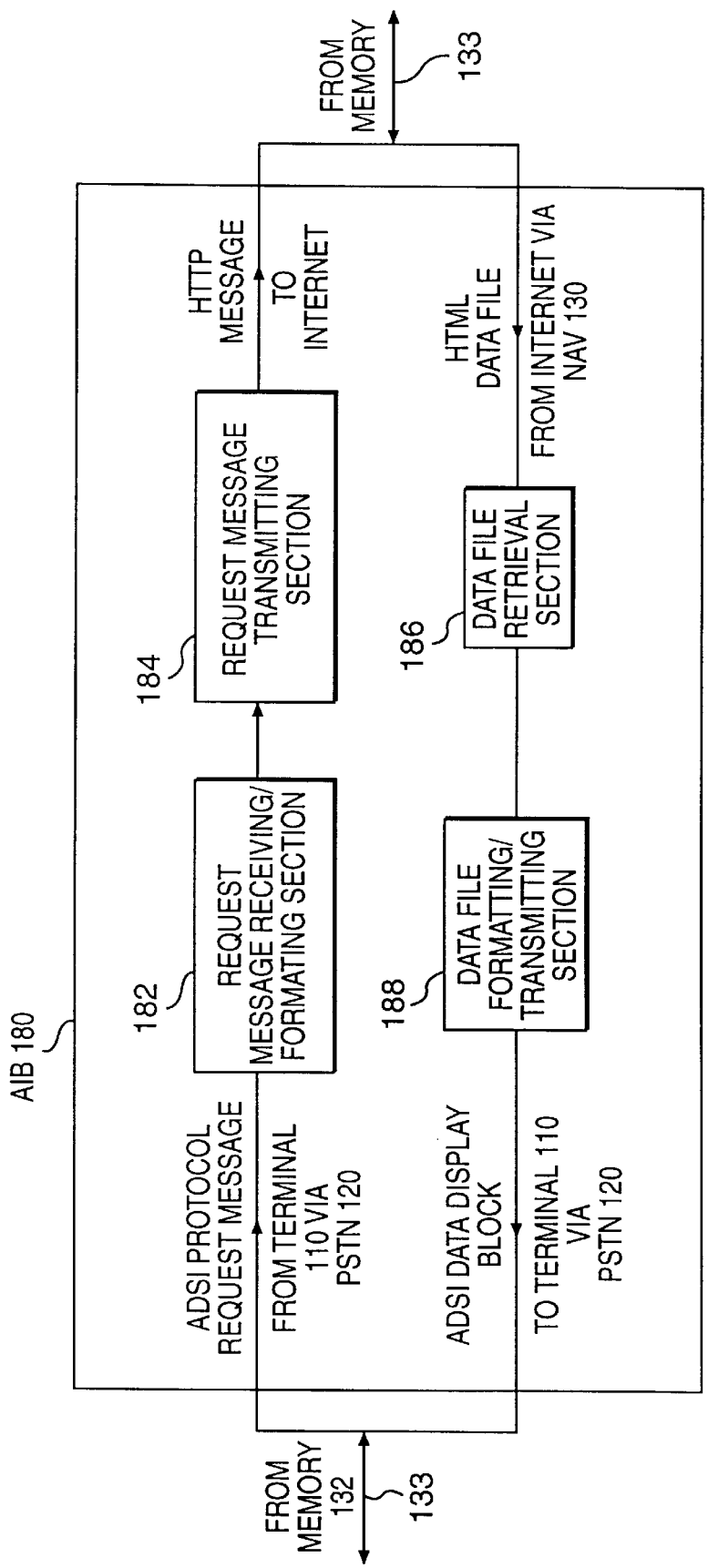
FIG. 3 is a block diagram showing the further details of the browser device of FIG. 2.

FIG. 3 shows a functional block diagram of the AIB 180 in greater detail. The specific functions of the sections are described in greater detail below in conjunction with FIGS.

4–8. AIB 180 contains a request message receiving and formatting section 182 for receiving a user data file request from first memory 132 via data bus 133. In addition, section 182 interprets the ADSI protocol data file request message received from terminal 110 and stored in memory device 132 to thereby, generate a corresponding HTTP formatted message. The request message transmitting section 184 receives the HTTP request message and transmits it to memory 134 and Web Server 150.

Once the data file is located, a data file retrieval section 186 retrieves the HTML data file from the Internet via memory 134 and data bus 133. Section 186 is connected to a data file formatting and transmitting section 188 that formats the HTML data file to be compatible with the display capabilities of screen-display 111. As explained in more detail below, this process could involve identifying particular sections of the data file for display, and eliminating, or truncating, those display lines that exceed the display capacity of screen-display 111. Preferably, the reformatting process involves using ADSI scripting techniques to configure the entire data file to a data display block specifically designed for the ADSI screen-display, and compliant with the ADSI protocol requirements.

B. Internet Data Retrieval

In order to retrieve Web pages and display them in the ADSI format, system 100 permits a user to access Internet locations through Web 140. To do this, the Internet site location request signals received from terminal 110 must be decoded by AIB 180 to a format that Web Server 150 and URL servers such as those at 160, 161, and 162 can interpret and understand. Preferably, this would involve interpreting the received request message to generate a corresponding HTTP formatted message. Once Web Server 150 receives a location selection, it transmits the data file contained at the requested site location back to terminal 110 via the telephony platform server, which in this case is NAV 130. After NAV 130 receives the data file from the Internet site via the Web Server 150, AIB 180 formats the data file to an ADSI compatible data display block so that it may be transmitted to terminal 110 in a form terminal 110 can display.

Figure 4:
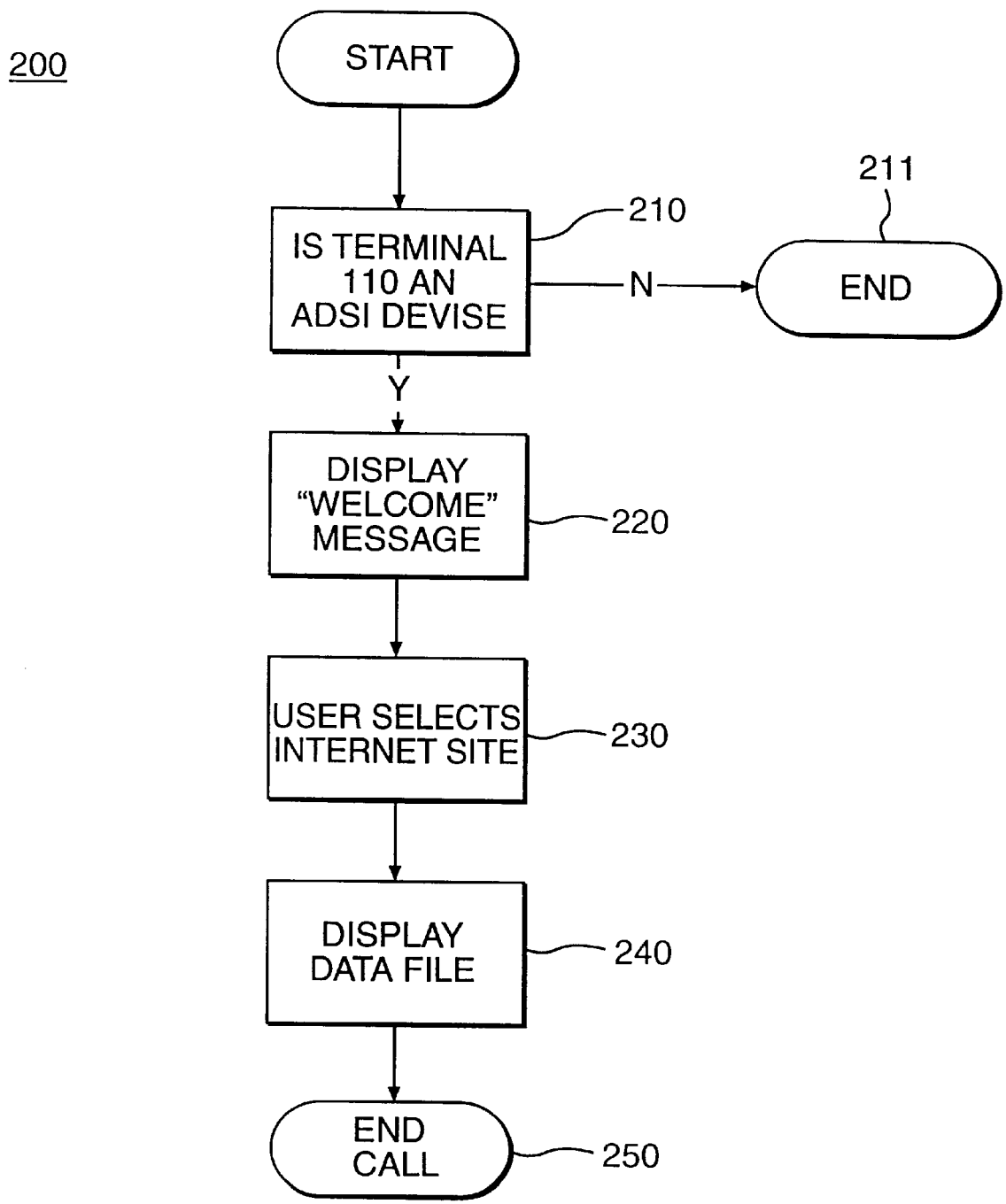
FIG. 4 is flowchart showing a method used to access the Internet and retrieve Internet data files using a screen-display telephone terminal consistent with FIG. 1.

FIG. 4 shows a general overview of method 200, a call flow script used in conjunction with system 100 for retrieving an Internet data file from Web 140 using terminal 110. The subsequent figures, FIGS. 5–8, then show further details of the method 200 as specified.

With reference now to FIG. 4, upon receiving a request from a user to access the system 100, NAV 130 determines if the requesting terminal 110 is an ADSI compatible device. (Step 210). If not, the call and process are terminated at step 211. If terminal 110 is ADSI compatible, then using conventional ADSI techniques, NAV 130 transmits a "WELCOME" message to terminal 110 for display on screen-display 111. (Step 220). This informs the user that the connection to NAV 130 has been completed and that the user may commence using the features displayed. The "WELCOME" message may also include an individual or universal homepage from which users begin their Internet access. It is contemplated that the homepage will guide the user through the process described above with the commands and procedures that follow.

From the homepage or "WELCOME" screen, the user is permitted to make an Internet site selection (Step 230), by depressing a number on keypad 116 or selecting a softkey 113 corresponding to the URL to be accessed. That is, the user can select which of the available Web sites are to be visited and, therefore, which data files will be retrieved. As described above, by way of example only, potential Web sites could include a Nortel Homepage, a Yahoo Homepage, a Fortune Homepage, a Time/Temperature location, or a Hello World Homepage. It also is contemplated that other sites may be accessed with the present invention. Once the site selection has been made, NAV 130 retrieves the data file from the selected site and transmits it to terminal 110, where the Internet data or content is displayed on screen-display 111 in a compatible format. (Step 240). The call process ends when the user has completed all the desired selections and retrieved the requested data file. (Step 250). While the described method 200 outlines the general process used by system 100, more detailed explanations of the individual steps are described hereinbelow.

Figure 5:
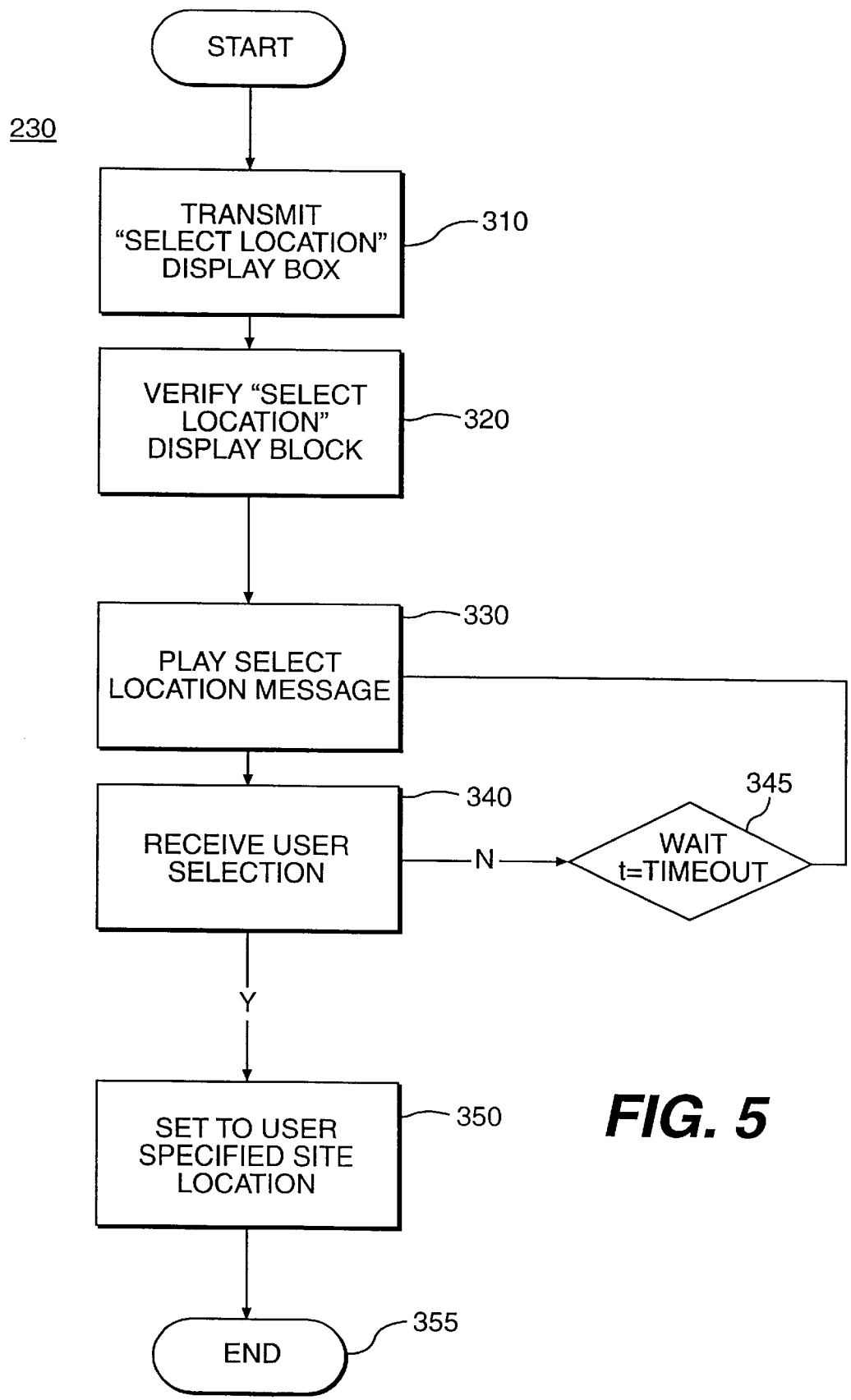
FIG. 5 is a flow chart showing further details of an Internet site selection process consistent with the method of FIG. 4.

FIG. 5 shows the Internet site selection process 230 of FIG. 4 in greater detail. First, NAV 130 transmits to terminal 110 a "SELECT LOCATION" ADSI display block, as described below, that is displayed on screen-display 111. (Step 310). This data display block presents the user with a number of Internet site locations from which to choose. To accomplish this process, NAV 130 looks internally to a stored memory location for a particular ADSI display block. The ADSI display block selected would depend on the particular application being requested by terminal 110. In this instance, the "SELECT LOCATION" display data block represents the Internet site selection application of the present invention. The ADSI display block is a display formatting command structure that tells terminal 110 the form in which the transmitted information will appear on the screen-display 111. The ADSI display block may also define the softkeys and the particular DTMF, or other appropriate communication signal, the terminal will return upon the selection of a specified softkey. A simple ADSI display block may be described with the following example.

| SOFT KEY 1 | SOFT KEY 2 | SOFT KEY 3 |
|---|---|---|
| label = "Hello World" when pressed: return DTMF "1" | label = "Yahoo" when pressed: return DTMF "2" | label = "Nortel" when pressed: return DTMF "3" |

The label designation informs the display and user of the site location assigned to the particular softkey 113, and the return indication tells the terminal 110 what DTMF signal to return to NAV 130 upon the softkey's selection. Further, this block informs terminal 110 of the form in which a data line will appear on screen-display 111, and if appropriate, the return signal to transmit when a particular selection is made. Preferably, the entire block of information is transmitted in one command message, or modem databurst, as described by the ADSI protocol. This display block allows terminal 110 to display the data block without interpreting the individual data lines; that is, terminal 110 simply displays the data display block as received in the databurst. It should be noted that this example is for exemplary purposes only and the true display block would be in the appropriate ADSI protocol format, as defined by the ADSI protocol standard. Once displayed, this data block presents the user with selection choices and commands, including the softkey 113 or keypad 116 selection requirements, necessary to implement the URL section and data file retrieval from screen-display 111.

With further reference to FIG. 4, once the site location display block has been sent, NAV 130 verifies that the display block was successfully received by the terminal 110. (Step 320). This verification step may be accomplished by receiving a return acknowledgment message from the terminal 110, or in the alternative, by setting an internal flag within NAV 130 upon transmission on the display block. Upon verification, NAV 130 transmits, and terminal 110 receives, an Interactive Voice Response (IVR) instruction from NAV 130, and plays a "SELECT LOCATION" message. (Step 330). The terminal 110 will preferably play a user message such as "Please Select Location Now" through speaker 114; however, the message may also be presented graphically on screen-display 111. When the user selects an Internet site either by, for example, the key-pad 116, the softkeys 113, or voice input through handset 115, NAV 130 receives a corresponding communication message indicating the user's site location request. (Step 340). For the purposes of this invention, communication signal received from terminal 110 may be a DTMF or any acceptable ADSI signaling communication, as described in the ADSI protocol. If the user does not make a selection within an appropriate period, a timeout occurs (Step 345), and terminal 110 repeats the "SELECT LOCATION" message. (Step 330). It is also contemplated that the user may terminate the procedure at any point in the process by hanging up or sending a "QUIT" command from terminal 110 to NAV 130. Preferably, AIB 180 resides on NAV 130, or is accessible by the NAV 130 through a conventional data communication medium, such as data bus 133.

AIB 180 receives a corresponding communication message indicating the user's site location request 110, the site location is set by AIB 180. (Step 350). To accomplish the step, AIB 180 uses the site selected by the user (Step 350) to determine the host server serving the selected site. A site HOSTNAME and PATHNAME that corresponds to the selected Internet site is used to connect AIB 180 to the appropriate site through Web Server 150. Preferably, the user can make his Internet site selection choice by responding with a selection of an appropriate softkey 113, or selection of a key on keypad 116. In the alternative, it is also contemplated that site selection may be accomplished by having the user directly input a HOSTNAME and PATHNAME, at a command line on the "WELCOME" screen. In either event, the selection message received from the user is used by AIB 180 as a pointer to the appropriate Web page location, and WEB Server 150.

To summarize, the system has now retrieved the URL selected by the user and pointed the AIB 180 to the correct Internet site location. The next step is to retrieve the Internet data file, or Web page, and display it on screen-display 111 in an ADSI compatible format. This process is further described in detail hereinbelow.

Figure 6:
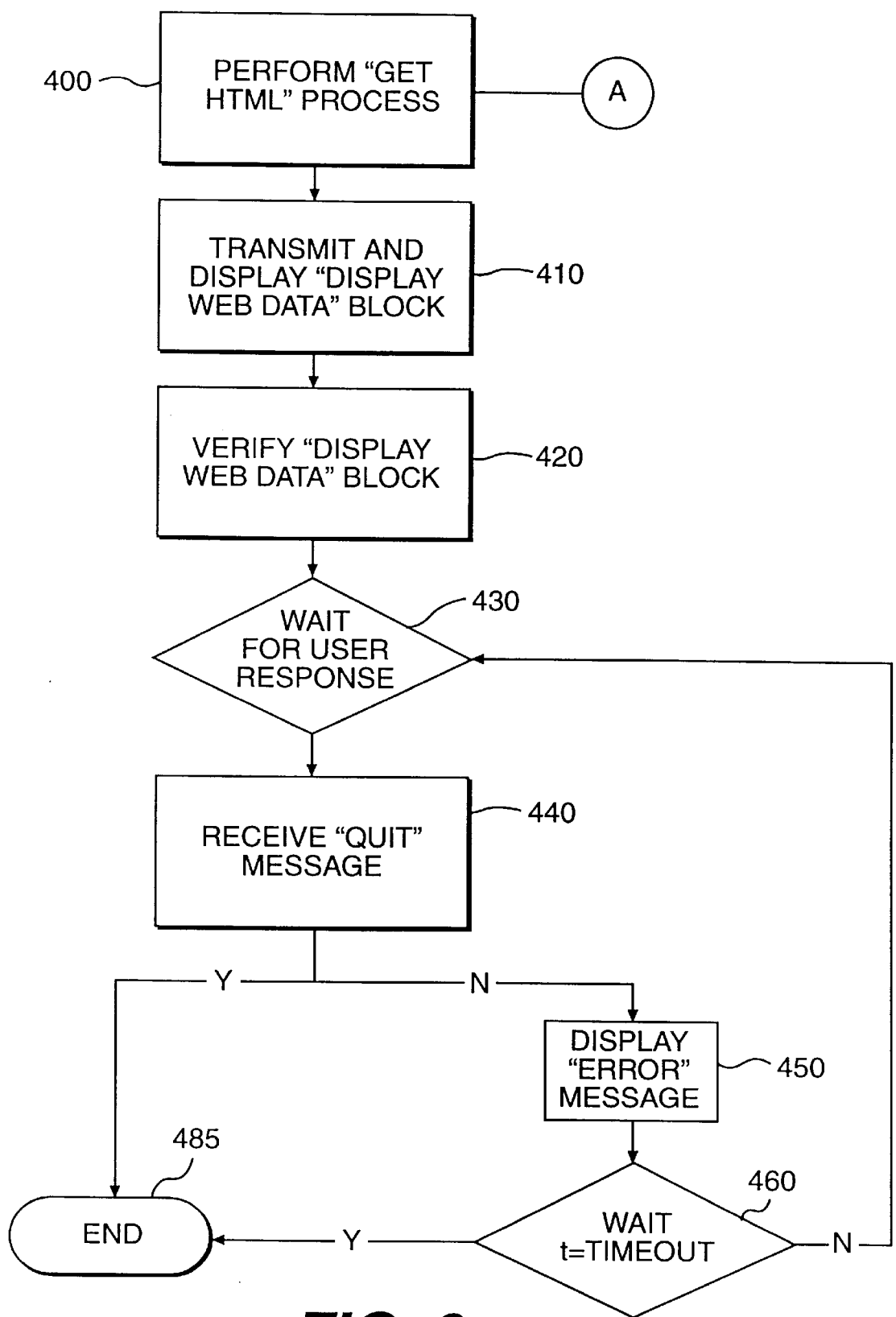
FIG. 6 is a flow chart showing further details of an Internet data file display process consistent with the method of FIG. 4.

FIG. 6 shows the URL display process of FIG. 4 (Step 240) in greater detail. This process, along with those contained in further detail in FIGS. 7 and 8, accesses the Host Server 155 containing, or serving, the Internet site requested by the user; retrieves the requested data file from the Internet site; reformats the data file retrieved from the host server to a format compatible with screen-display 111; and transmits the re-formatted data file to terminal 110.

AIB 180 performs the "GET HTML" process (Step 400) to retrieve the URL corresponding to the site-location request received from terminal 110, as will be described in further detail below with reference to FIGS. 7 and 8. The letter "A" in FIG. 6 refers to the further details shown in FIG. 7, and the letter "B" in FIG. 7 likewise refers to FIG. 8.

The "GET HTML" process (Step 400) involves using the HOSTNAME and PATHNAME corresponding to the selected URL to connect AIB 180 to the appropriate site through Web Server 150 and Host Server 155. The Web Server 150 uses the HOSTNAME and PATHNAME to retrieve an HTML-formatted data file and transmits it to memory 134 in NAV 130. AIB 180 then retrieves the data file from the memory 134.

With further reference to FIG. 6, once the HTML data file has been received and formatted by AIB 180 to an ADSI protocol display block, the display block is sent to terminal 110 and displayed on screen-display 111 (Step 410). NAV 130 accomplishes the transmission by sending a "DISPLAY WEB DATA" block to terminal 110. Again, this data block represents the HTML data file reformatted by the AIB 180 and corresponding to the user's URL request. Once transmitted, the NAV 130 verifies the receipt of the "DISPLAY WEB DATA" block. (Step 420). This can be achieved by, for example, transmitting a return message from the terminal 110 to NAV 130 when the data display block is received at the terminal 110. NAV 130 would use this return message to set an internal "flag" that informs NAV's 130 verification process that the data block transmission was successful. Once the data display block is successfully received by terminal 110, screen-display 111 displays the data display block for the user.

Further with respect to FIG. 6, upon completion of the verification (Step 420), NAV 130 waits to receive a communication signal from terminal 110 indicating whether the user wishes to quit the call. (Step 430). The user may, of course, use the retrieved data display block to link to other applications or Internet locations by, for example, selecting one of a number of new softkey definitions sent with the data display block. Using ADSI scripting techniques, these new softkey commands may be imbedded in the data display block. As shown, in FIG. 6, however, the user may terminate the process at the end of receiving the initially requested data file. To accomplish this, the user would send a "QUIT" communication signal via the user's selection of one of the softkeys 113, or a number on keypad 116 of terminal 110. If a correct communication signal is received (Step 440), then subprocess 240 ends and the call terminates. (Step 485). If the communication message indicates an incorrect response, then NAV 130 will transmit and the terminal 110 will display an "ERROR" message on screen-display 111. (Step 450). If a timeout occurs before a quit message is received (Step 460), subprocess 240 ends and the call terminates. (Step 485).

While the Internet call interface and data file retrieval process have now been shown to be completed with respect to FIGS. 4–6, the further detailed substeps for carrying out the operation of method 200 are detailed below. FIGS. 7 and 8 show the details of (1) connecting the user with the Internet through the Web Server 150; (2) retrieving a requested data file; and (3) formatting the requested data file to be compatible with an ADSI display device.

Figure 7:
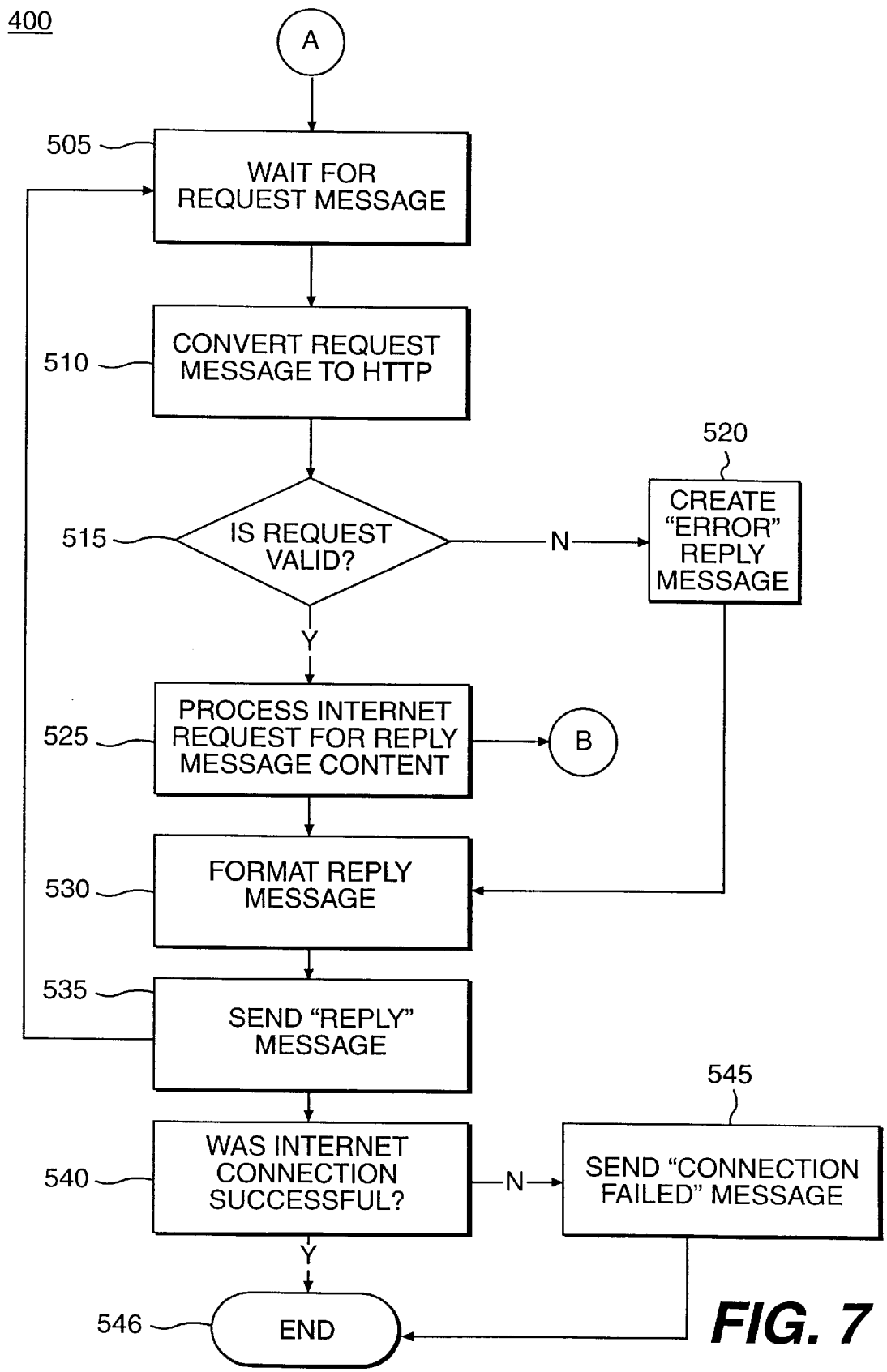
FIG. 7 is a flow chart showing an Internet connection and data file retrieval process consistent with the method of FIG. 6.

FIG. 7 is a flow chart showing of the Internet connection and data retrieval process (Step 400) of FIG. 6 in greater detail. Initially, AIB 180 waits for a data file request message from the user. (Step 505). Once the data file request message is received, it is decoded from an ADSI protocol message to an Internet compatible protocol message, HTTP, to ensure a proper interface with the Internet and URL site selected. (Step 510). To accomplish this step AIB 180 uses the received signal corresponding to the user's site request to perform a mapping to the appropriate site location. When, for example, NAV 130 transmits the "WELCOME" screen to terminal 110, it could assign an DTMF signal response to the site locations displayed on screen-display 111. If the user transmitted a request to retrieve the Nortel Homepage, AIB 180 would interpret the received signal as a request, for example, DTMF "1" to generate the command line "GET http:\\www.nortel.com." This HTTP formatted command line would then be used by AIB 180 to establish a connection between the AIB 160 and the appropriate URL location such as URL 160.

Next, AIB 180 determines whether the user data request message received from terminal 110 via NAV 130 is valid. (Step 515). An invalid request could occur, for example, if the user selected an inappropriate softkey 113 or numeric key from keypad 116. If the request is not a valid message, AIB 180 creates an "ERROR" reply message (Step 520), and proceeds to format the ERROR reply message for transmission to terminal 110 via NAV 130. (Step 530). The formatting process formats the error signal for ADSI protocol. If the request is valid, however, AIB 180 processes the Internet request for its reply content. (Step 525). The details for processing the Internet request will be explained in further detail below in connection with process 525 and letter "B," as shown in FIG. 8.

After processing the Internet data file request for its message content, AIB 180 formats the reply message to convert the reply message received from the Internet to an ADSI compatible format. (Step 530). Preferably, if the Internet connection and retrieval process were successful, as described in connection with FIG. 8 below, the reply message will contain a data file retrieved from the Internet and Host Server 155 via the Web 140. It is contemplated by the current embodiment that the data file will be received from the Web 145 in an HTML format and correspond to the data file request message received from the user. When received at AIB 180, the data file must be formatted (Step 530), so that it may be properly transmitted and ultimately displayed on screen-display 111.

With conventional ADSI scripting techniques, AIB 180 creates a data display block containing only the most relevant portions of the retrieved data file. This newly formatted data display block would be created to specifically fit onto the screen-display 111. For example, when a data file has been retrieved, AIB 180 determines the display size of the data file by its size, or memory capacity. If the display size is larger than the capabilities of screen-display 111, AIB 180 inserts at least two ADSI command lines into the data file. The first command line would inform terminal 110 of the start of the data display block, while the other would indicate its end. When the reformatted data file is transmitted to terminal 110, screen-display 111 shows the user the data lines contained between the ADSI command lines.

Preferably, however, the formatting process of (Step 530) would involve reformatting the HTML data file to specifically fit onto screen-display 111. This could include a process which reformatted the received data file to a more accurate and desirable representation than the limited data block described above. This process would further involve using ADSI scripting techniques to ensure that the proper ADSI transfer and display command lines were inserted into the newly formatted data display block. This process would make the data file interpretation more relevant for the user because it would not include the text features of HTML, such as bold or italics text which may not be supported by terminal 110.

If the reply message received from the subprocess (Step 525) is not a data file, there will be an "ERROR" message indicating a failure in the Internet connection attempt and that no data file was retrieved from Host Server 155. Once received by AIB 180, this Internet message is also formatted by conventional techniques to ensure that it complies with the ADSI protocol standard, and sent to terminal 110. (Step 530).

With further reference to FIG. 7, AIB 180 next determines whether the Internet connection was successfully accomplished. (Step 540). If the message received by AIB 180 was an ERROR message, NAV 130 transmits, and terminal 110 receives, and screen-display 111 displays a "CONNECTION FAILED" message. (Step 545). If the connection was successful, indicated by an absence of an error message, the subprocess (Step 400) terminates. (Step 546). If upon retrieval of the data file the user makes another site selection via softkey 113 or keypad 116, process 400 returns to Step 505. (Step 535). The completion of this process (Step 400) returns the procedure back to display process (Step 240), as described above in connection with FIG. 6.

Figure 8:
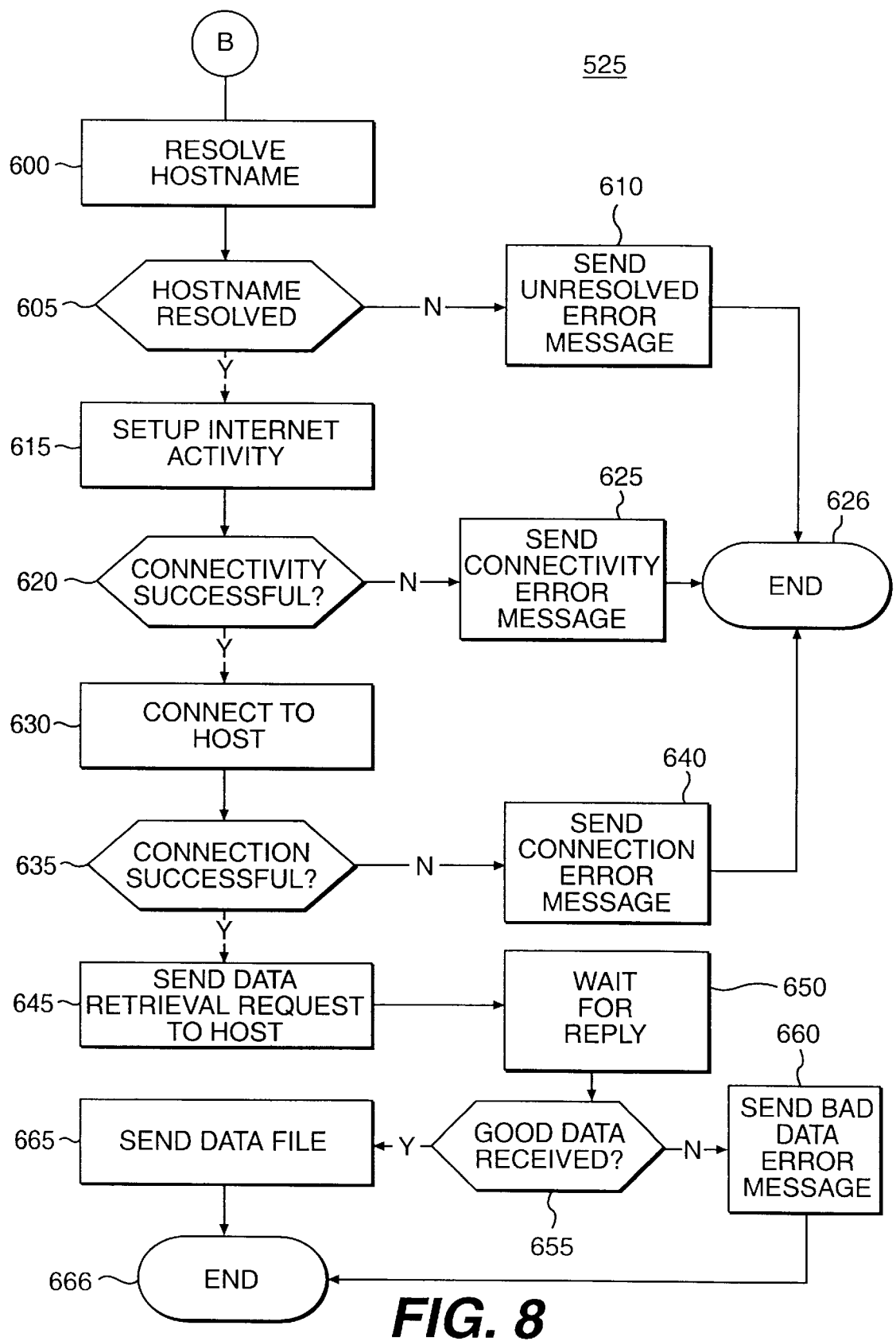
FIG. 8 is a flow chart showing the Internet connection and data file retrieval process consistent with the method of FIG. 7.

FIG. 8 is a flow chart showing the step of processing the Internet site-location request reply message of FIG. 7 (Step 525) in greater detail. First, in order to verify the Internet site location, an attempt is made to resolve, or confirm, the host name for the URL selected by the user. (Steps 600 and 605). If the host name is not resolved, an "UNRESOLVED" error message is sent to AIB 180 (Step 610) and the process ends, returning the subprocess (Step 400) to Step 530 explained above in conjunction with FIG. 7. (Step 626). If the host name is resolved, an attempt is made to set up an Internet data link between the server serving the selected site and AIB 180. (Steps 615 and 620). These steps ensure that the site and data file requested by the user correspond to valid locations.

If connectivity is not successful, a "CONNECTIVITY" error message is sent to AIB 180. (Step 625). If successful, an attempt is made to connect to the Host Server 155. (Steps 630 and 635). These steps ensure that a compatible protocol, HTTP, is used for contacting the Host Server. If the connection is not successful, a "CONNECTION" error message is sent to the AIB 180 (Step 640) and the subprocess ends, returning procedure 400 to Step 530 in FIG. 7. (Step 626). A "CONNECTION" error could occur, for example, if the transmission medium 146 is unable to comply with the user's site location request due to overuse or some other problem with the data link.

If the connection is successful, a data retrieval request is sent to the Host Server 155. (Step 645). The server serving the selected URL uses the information contained in the site location request message to retrieve a data file corresponding to the Internet site requested by the user.

After waiting for a reply (Step 650), AIB 180 determines if valid data file has been received from the Host Server 155 and Web Server 150. (Step 655). Data content assessment may be accomplished by verifying that the data file received favorably compares to expected data content. If invalid data is received, a "BAD DATA" error message is sent (Step 660) and the sub-process ends, returning procedure 400 to Step 530 in FIG. 7. If "GOOD DATA" is received, the data is sent and the subprocess ends, returning procedure 400 to Step 530 in FIG. 7. (Steps 665 and 666).

To summarize, the "GOOD DATA" represents the Internet data file requested by the user and may include an HTML file, audio file, or a CGI-script file. The data file is then transmitted to the AIB 180 which formats the HTML data file to a data display block compatible with the display characteristics of screen-display 111. The reformatted data display block may be created with conventional ADSI scripting techniques to ensure it is specifically formatted for the screen-display 111. The reformatted data display block is then transmitted using the ADSI protocol to terminal 110 for display on screen-display 111. The newly formatted data file may contain additional softkey definitions that would allow the user to link the user to other ADSI applications or Web sites. To link to another ADSI application, the softkey 113 or keypad 116 selected would direct the NAV 130 and AIB 180 to another Web Server 150 serving the requested ADSI application.

It will be apparent to those skilled in the art that various modifications and variations can be made in the implementation of the present invention without departing from the scope or spirit of the invention. For example, while this invention has been described in the context of the ADSI protocol it is contemplated that any telephone or terminal with an integrated screen-display could use the features of the present invention. In addition, data files written in other markup languages such as, for example, JAVAScript, HDML, or ATML could be reformatted by AIB 180 for display on the screen-display 111.

Further other modifications or variations to the system would still capture the spirit of the present invention. For example, IVR messages may be integrated to complement the displaying functions of terminal 110. That is, when an error message is displayed on the screen-display 111, an IVR would be played to guide the user through the next step.

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. A method for retrieving Internet data files for display on an ADSI screen-display telephone terminal, the method comprising the steps of:

receiving, at a telephony platform server, a data file request corresponding to an Internet site location selected from the ADSI screen-display telephone terminal;

interpreting the received data file request to generate an Internet protocol message;

transmitting the Internet protocol message to an Internet site location, wherein the Internet protocol message corresponds to the data file request received and the Internet site location corresponds to the data file requested;

retrieving an Internet data file from the Internet site location;

formatting the Internet data file received in response to the Internet protocol message for display on the ADSI screen-display telephone terminal; and transmitting the retrieved data file to the ADSI screen-display telephone terminal.

2. The method of claim 1, wherein the Internet protocol is a Hypertext Transfer Protocol (HTTP), and wherein the step of interpreting the received data file request includes the substep of generating an HTTP formatted request message.

3. The method of claim 1, wherein the Internet data file received is formatted in a markup language, and wherein the step of retrieving the Internet data file includes the substep of receiving the retrieved Internet data file at the telephony platform server.

4. The method of claim 1, wherein the Internet data file received is formatted in a markup language, and wherein the step of formatting the Internet data file includes converting the retrieved Internet data file formatted in the markup language to an ADSI data display block.

5. The method of claim 4, wherein the markup language is a Hypertext Markup Language (HTML), and wherein the step of converting the markup language formatted data file includes the substep of converting the HTML data file to an ADSI protocol data display block.

6. The method of claim 4, wherein the markup language is a Handheld Device Markup Language (HDML), and wherein the step of converting the markup language formatted data file includes the substep of converting the HDML data file to an ADSI protocol data display block.

7. A web browser device in an ADSI telephone system, wherein the system includes at least one ADSI screen-display telephone terminal and a telephone platform server connected to a plurality of Internet servers, the web browser device residing on the telephony platform server and comprising:

means for receiving an ADSI protocol data file request corresponding to an Internet site location from the at least one ADSI screen-display telephone terminal;

means, connected to the means for receiving, for interpreting the received data file request to generate an Internet protocol message;

means, connected to the means for interpreting, for transmitting the Internet protocol message to the Internet site location, wherein the Internet site location corresponds to the data file received from the at least one ADSI screen-display telephone terminal;

means for retrieving an Internet data file from the Internet site location;

means, connected to the means for retrieving, for formatting the Internet data file, received in response to the Internet protocol message, to an ADSI data display block; and means for transmitting the ADSI data display block to the at least one ADSI screen-display telephone terminal.

8. The browser device of claim 7, wherein the data file retrieved from the Internet is formatted in a markup language, and wherein means for formatting further includes means for converting the retrieved data file formatted in the markup language to the ADSI data display block.

9. The browser device of claim 8, wherein the markup language is a Hypertext Markup Language (HTML).

10. The browser device of claim 8, wherein the markup language is a Handheld Device Markup Language (HDML).

* * * * *

UNITED STATES PATENT AND TRADEMARK OFFICE
CERTIFICATE OF CORRECTION

PATENT NO. : 5,930,341
DATED : July 27, 1999
INVENTOR(S) : RAYMOND A. CARDILLO, IV ET AL.

It is certified that error appears in the above-identified patent and that said Letters Patent is hereby corrected as shown below:

Claim 4, column 14, line 7, change "claim 1" to --claim 3--.

Signed and Sealed this

Thirtieth Day of November, 1999

Attest:

Attesting Officer

Q. TODD DICKINSON

Acting Commissioner of Patents and Trademarks